United States Patent
Bamba et al.

(10) Patent No.: US 9,565,539 B2
(45) Date of Patent: Feb. 7, 2017

(54) ELECTRONIC DEVICE AND CALL TRANSFER CONTROL METHOD

(71) Applicant: KYOCERA Corporation, Kyoto-shi, Kyoto (JP)

(72) Inventors: Hiroyuki Bamba, Sagamihara (JP); Nayu Nomachi, Minoh (JP); Tomohiro Sudou, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/431,553

(22) PCT Filed: Sep. 26, 2013

(86) PCT No.: PCT/JP2013/076127
§ 371 (c)(1),
(2) Date: Mar. 26, 2015

(87) PCT Pub. No.: WO2014/050996
PCT Pub. Date: Apr. 3, 2014

(65) Prior Publication Data
US 2015/0256987 A1    Sep. 10, 2015

(30) Foreign Application Priority Data

Sep. 28, 2012  (JP) ................................. 2012-218170

(51) Int. Cl.
*H04B 7/15* (2006.01)
*H04M 11/10* (2006.01)
(Continued)

(52) U.S. Cl.
CPC .......... *H04W 4/16* (2013.01); *G06F 17/30997* (2013.01); *H04M 1/006* (2013.01); *H04M 1/72527* (2013.01); *H04M 3/54* (2013.01)

(58) Field of Classification Search
CPC .............. H04W 84/16; H04W 52/105; H04W 52/0254; H04W 84/105; H04W 16/10; H04W 68/00; H04W 36/30
(Continued)

(56) References Cited

U.S. PATENT DOCUMENTS

| | | | | |
|---|---|---|---|---|
| 5,127,042 A | * | 6/1992 | Gillig | .................... H04W 84/16 455/11.1 |
| 5,148,471 A | * | 9/1992 | Metroka | ............... H04M 1/271 379/88.02 |

(Continued)

FOREIGN PATENT DOCUMENTS

| | | |
|---|---|---|
| JP | 63-131763 A | 6/1988 |
| JP | 3-190458 A | 8/1991 |

(Continued)

OTHER PUBLICATIONS

Office Action in JP Application No. 2014-538600, mailed May 24, 2016, for which an explanation of relevance is attached.

*Primary Examiner* — William D Cumming
(74) *Attorney, Agent, or Firm* — Hauptman Ham, LLP

(57) ABSTRACT

According to one of aspects, an electronic device, includes: a first communication unit configured to perform communication using a first communication scheme; a second communication unit configured to perform communication using a second communication scheme; and a control unit. When the first communication unit detects an incoming call, the control unit transfers the incoming call to which information linked with an incoming call number of the incoming call is added from the second communication unit to a specific electronic device.

12 Claims, 8 Drawing Sheets

(51) Int. Cl.
  *H04W 72/00* (2009.01)
  *H04W 4/16* (2009.01)
  *H04M 1/00* (2006.01)
  *H04M 1/725* (2006.01)
  *G06F 17/30* (2006.01)
  *H04M 3/54* (2006.01)

(58) Field of Classification Search
  USPC .......... 455/11.1, 413, 426.1, 436, 464, 566; 379/88.02, 388.03
  See application file for complete search history.

(56) References Cited

U.S. PATENT DOCUMENTS

| | | | | |
|---|---|---|---|---|
| 5,175,759 A | * | 12/1992 | Metroka | H04W 52/0254 455/566 |
| 5,260,988 A | * | 11/1993 | Schellinger | H04W 84/105 455/464 |
| 5,276,730 A | * | 1/1994 | Cimini, Jr. | H04W 16/10 455/436 |
| 5,278,890 A | * | 1/1994 | Beeson, Jr. | H04W 68/00 340/7.24 |
| 5,363,426 A | * | 11/1994 | Nyhart | H04W 68/00 340/7.28 |
| 5,367,558 A | * | 11/1994 | Gillig | H04W 36/30 455/426.1 |
| 5,379,338 A | * | 1/1995 | Umemoto | H04M 1/6075 379/388.03 |
| 6,253,075 B1 | * | 6/2001 | Beghtol | H04M 1/663 455/413 |

FOREIGN PATENT DOCUMENTS

| | | |
|---|---|---|
| JP | 5-56172 A | 3/1993 |
| JP | 9-200301 A | 7/1997 |
| JP | 2002-64640 A | 2/2002 |
| JP | 2002-152829 A | 5/2002 |
| JP | 2003-134224 A | 5/2003 |
| JP | 2004-159099 A | 6/2004 |
| JP | 2007-81498 A | 3/2007 |
| JP | 2009-111888 A | 5/2009 |
| JP | 2012-84978 A | 4/2012 |

* cited by examiner

FIG.3

| NAME | TELEPHONE NUMBERS | GROUP | IMAGE | INCOMING CALL SETTING |
|---|---|---|---|---|
| MR. A | 090-XXXX-XXX1 | GROUP A | yyyyy.pct | RINGER A, VIBRATION A, LIGHTING A |
| MR. B | 080-XXXX-XXX2 | GROUP B | | RINGER B, VIBRATION B, LIGHTING B |
| MR. C | 080-XXXX-XXX3 | | zzzzz.pct | RINGER C, VIBRATION C, LIGHTING C |
| ... | ... | ... | ... | ... |

| ITEM | SETTING |
|---|---|
| CALL TRANSFER | ACTIVATED |
| DESTINATION | MOBILE PHONE 30 |
| ... | ... |

| ITEM | SETTING |
|---|---|
| SPECIFIED NUMBER BLOCK | ACTIVATED |
| TELEPHONE NUMBER TO BE REJECTED | 090-XXXX-XXXX |
| ... | ... |

| INCOMING CALL NUMBER | DATE AND TIME | DETAILS |
|---|---|---|
| 090-XXXX-XXX1 | 2012/8/20 8:38 | INCOMING CALL ORIGINATED BY SPECIFYING TELEPHONE NUMBER |
| 080-XXXX-XXX2 | 2012/8/20 9:42 | TRANSFERRED INCOMING CALL |
| ... | ... | ... |

9g

US 9,565,539 B2

ELECTRONIC DEVICE AND CALL TRANSFER CONTROL METHOD

CROSS-REFERENCE TO RELATED APPLICATION

This application is a National Stage of PCT international application Ser. No. PCT/JP2013/076127 filed on Sep. 26, 2013 which designates the United States, incorporated herein by reference, and which is based upon and claims the benefit of priority from Japanese Patent Application No. 2012-218170 filed on Sep. 28, 2012, the entire contents of which are incorporated herein by reference.

FIELD

The present application relates to an electronic device and a transfer control method.

BACKGROUND

Techniques are known in which, when an incoming call is received by a mobile phone, communication related to the incoming call is performed using another electronic device. For example, a separated mobile phone of wireless headset type, which includes a wireless communication module supporting Bluetooth (registered trademark), has been developed. This technique allows a user to make or receive a phone call with a headset attached to his or her ear and a mobile phone placed inside a bag.

SUMMARY

According to one of aspects, an electronic device, includes: a first communication unit configured to perform communication using a first communication scheme; a second communication unit configured to perform communication using a second communication scheme; and a control unit. When the first communication unit detects an incoming call, the control unit transfers the incoming call to which information linked with an incoming call number of the incoming call is added from the second communication unit to a specific electronic device.

According to one of aspects, an electronic device, includes: a first communication unit configured to perform communication using a first communication scheme; a second communication unit configured to perform communication using a second communication scheme; and a control unit. When the second communication unit detects an incoming call, the control unit processes the incoming call according to information linked with an incoming call number of the incoming call. The information is added to the incoming call.

According to one of aspects, a transfer control method is performed by an electronic device including a first communication unit configured to perform communication using a first communication scheme and a second communication unit configured to perform communication using a second communication scheme. The transfer control method includes: detecting an incoming call by the first communication unit; and when the first communication unit detects an incoming call, transferring the incoming call to which information linked with an incoming call number of the incoming call is added from the second communication unit to a specific electronic device.

BRIEF DESCRIPTION OF DRAWINGS

FIG. 3 is a diagram illustrating one of examples of address book data.

FIG. 4 is a diagram illustrating one of examples of transfer setting data.

FIG. 5 is a diagram illustrating one of examples of call block setting data.

FIG. 7 is a diagram illustrating one of examples of incoming call history data.

DESCRIPTION OF EMBODIMENT

Embodiments for carrying out an electronic device and a transfer control method according to the present application will be described in detail with reference to the accompanying drawings.

Embodiment

Figure 1:
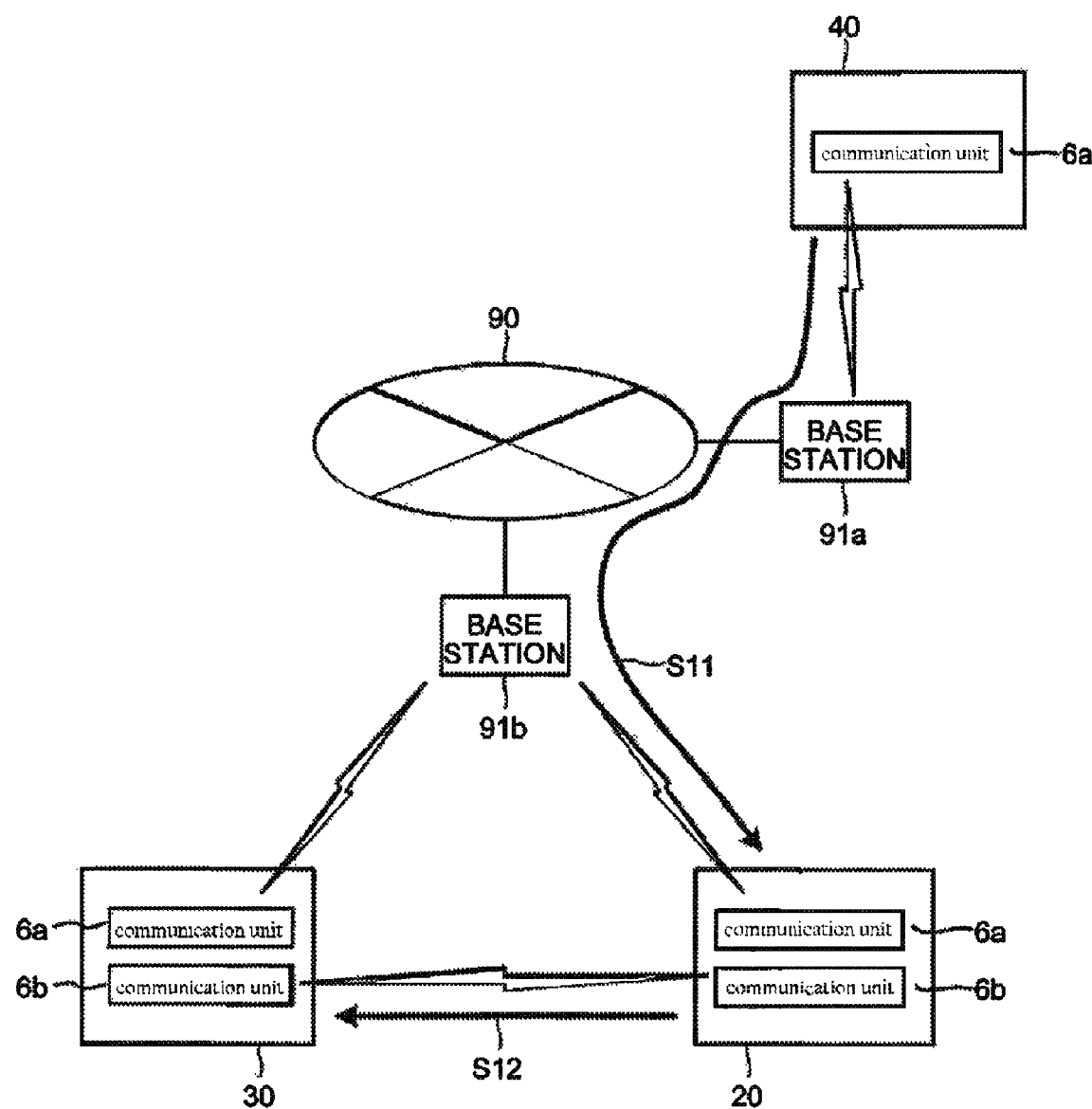
FIG. 1 is a diagram illustrating one of examples of transfer of an incoming call.

The following describes a transfer control method according to one of embodiments with reference to FIG. 1. FIG. 1 is a diagram illustrating one of examples of transfer of an incoming call. Mobile phones 20, 30, and 40 illustrated in FIG. 1 each include a communication unit 6a. The mobile phones 20 and 30 each further include a communication unit 6b. The electronic device such as the headset receives transmitted information only on a telephone number or the like as information relating to the incoming call. Thus, the above technique still has room for improvement in terms of users' convenience associated with incoming calls. For the foregoing reasons, there is a need for an electronic device and a transfer control method that can enhance the users' convenience associated with the incoming calls.

The communication unit 6a is configured to be capable of performing a telephone conversation through a public line network 90. In a scene illustrated in FIG. 1, the communication unit 6a of each of the mobile phones 20 and 30 is connected to the public line (carrier line) network 90 via wireless communication with a base station 91b. In the scene illustrated in FIG. 1, the communication unit 6a of the mobile phone 40 is connected to the public line (carrier line) network 90 via wireless communication with a base station 91a.

The communication unit 6b is configured to be capable of performing a telephone conversation through short-range wireless communication, such as the Bluetooth (registered trademark). In the scene illustrated in FIG. 1, the communication units 6b of the mobile phones 20 and 30 are capable of communicating with each other.

The mobile phones 20 and 30 are owned by the same user. The mobile phone 20 is set such that, when an incoming call is received, The mobile phone 20 transfers the incoming call to the mobile phone 30 through the short-range wireless communication by the communication unit 6b. Assume, for example, that the mobile phone 40 performs an outgoing call to the mobile phone 20 at Step S11. This outgoing call reaches the mobile phone 20 via the base station 91a, the public line network 90, and the base station 91b.

Upon detecting the incoming call, the mobile phone 20 transfers the incoming call to the mobile phone 30 via the short-range wireless communication by the communication unit 6b at Step S12. Upon detecting the incoming call, the mobile phone 30 notifies the user of the incoming call using a ring tone, vibration, a blinking lamp, or the like. Noticing the notification, the user performs a predetermined off-hook operation. This operation starts a telephone conversation between the mobile phone 30 and the mobile phone 40. The off-hook operation is an operation to start the telephone conversation in response to the incoming call. During the telephone conversation, the mobile phone 20 relays an exchange of voice data between the mobile phone 30 and the mobile phone 40. When one of them disconnects the call, the mobile phone 20 disconnects the connection of the telephone conversation with the other.

When transferring the incoming call, the mobile phone 20 adds information linked with an incoming call number (the telephone number of an originating end) to information to be transferred. Examples of the information linked with the incoming call number include information registered in an address book in association with the incoming call number, setting information set in association with the incoming call number, etc. Examples of the information registered in the address book in association with the incoming call number include, but are not limited to, a name, a group, a company name, and a profile image. Examples of the setting information set in association with the incoming call number include, but are not limited to, setting information relating to notification upon receiving an incoming call and setting information relating to call block. Examples of the setting information relating to notification upon receiving an incoming call include, but are not limited to, a ring tone, a vibration pattern, and a lamp lighting color and pattern. Examples of the setting information relating to call block include, but are not limited to, whether the incoming call number is subjected to the call block and whether a setting to execute the call block is activated.

As described above, when an incoming call addressed to the mobile phone 20 is transferred to mobile phone 30, the mobile phone 20 additionally transmits information linked with the incoming call number to the mobile phone 30. This enables the mobile phone 30 to achieve processing that provides even greater convenience to the user on the basis of the information linked with the incoming call number. For example, the mobile phone 30 can provide the user with detailed information on the originating end on the basis of the information registered in the address book in association with the incoming call number. Furthermore, on the basis of the setting information set in association with the incoming call number, the mobile phone 30 can perform a notification in the same pattern as that when the incoming call is received by the mobile phone 20 and can perform processing relating to the call block so as not to give the user unpleasant feeling.

The following describes, with reference to FIGS. 2 to 7, configurations of the mobile phone 20 and the mobile phone 30 illustrated in FIG. 1. In the following description, like parts may be identified by the same reference numerals and any redundant description may be omitted.

Figure 2:
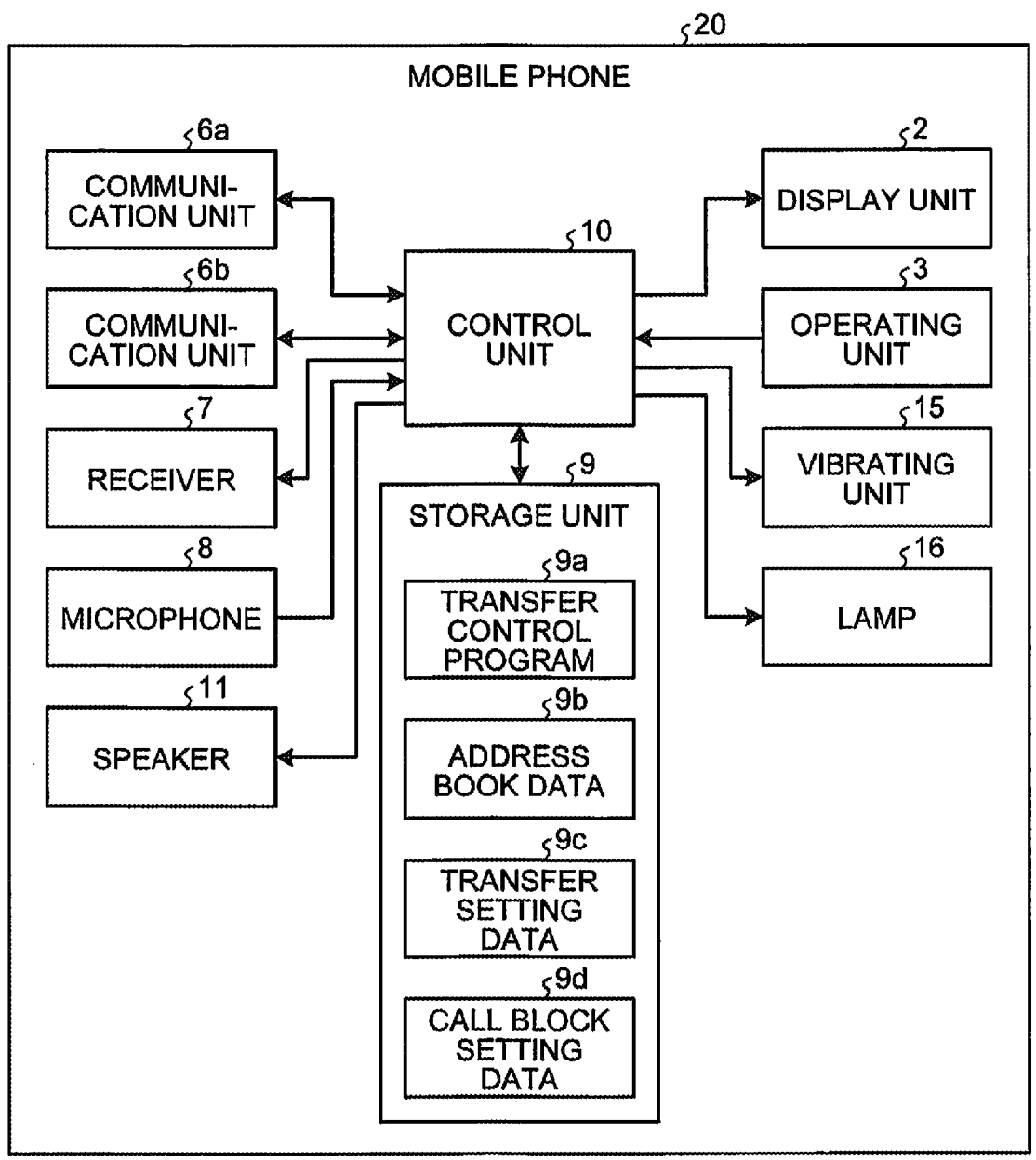
FIG. 2 is a block diagram illustrating a mobile phone that transfers an incoming call.

FIG. 2 is a block diagram illustrating the mobile phone 20, that is, the mobile phone 20 that transfers incoming calls. As illustrated in FIG. 2, the mobile phone 20 includes a display unit 2, an operating unit 3, a communication unit 6a, a communication unit 6b, a receiver 7, a microphone 8, a storage unit 9, a control unit 10, a speaker 11, a vibrating unit 15, and a lamp 16.

The display unit 2 includes a display panel such as a liquid crystal display or an organic electro-luminescence display. The display unit 2 displays information such as characters, graphics, and images in accordance with a signal input from the control unit 10. The information displayed on the display unit 2 includes a screen for notification, an icon, etc.

The operating unit 3 includes one or a plurality of devices for receiving operations performed by the user. Examples of the devices for receiving the operations performed by the user include, but are not limited to, a key, a button, a touch screen, etc. The operating unit 3 inputs a signal corresponding to the received operation to the control unit 10.

The communication unit 6a performs communication using the first communication scheme. In the embodiment, the first communication scheme is a communication scheme for performing communication via the public line network 90, such as 2G, 3G, and 4G. Examples of communication standards for performing communication via the public line network 90 include, but are not limited to, Long Term Evolution (LTE), Wideband Code Division Multiple Access (W-CDMA), CDMA2000, Personal Digital Cellular (PDC), Global System for Mobile Communications (GSM (registered trademark)), Personal Handy-phone System (PHS), etc. The first communication scheme may be a communication scheme for performing data communication over the public line network 90, such as Worldwide Interoperability for Microwave Access (WiMAX). When the first communication scheme is a communication scheme for performing data communication, a telephone conversation is achieved by combining a data transmission technique with a technique for transmitting voice as data, such as Voice over Internet Protocol (VoIP). The communication unit 6a may support a plurality of communication schemes for performing communication via the public line network 90.

The communication unit 6b performs communication using the second communication scheme. In the embodiment, the second communication scheme is a short-range wireless communication scheme. Examples of the short-range wireless communication scheme include, but are not limited to, Bluetooth (registered trademark), wireless LAN (IEEE802.11), ZigBee, infrared communication, visible light communication, near field communication (NFC), etc. The communication unit 6b may support a plurality of short-range wireless communication schemes.

The receiver 7 and the speaker 11 are sound output units. The receiver 7 and the speaker 11 each output a sound signal input from the control unit 10 as sound. The receiver 7 is used for outputting, for example, the voice of a remote party during a telephone conversation. The speaker 11 is used for outputting, for example, a ring tone and music. Either the receiver 7 or the speaker 11 may additionally have a function of the other. The microphone 8 is a sound input unit. The microphone 8 converts the voice of the user or the like to a sound signal and inputs the resultant sound signal to the control unit 10.

The storage unit 9 stores therein computer programs and data. The storage unit 9 is used also as a work space that temporarily stores therein results of processing performed by the control unit 10. The storage unit 9 may include any non-transitory storage medium such as a semiconductor storage medium, a magnetic storage medium, etc. The storage unit 9 may include a plurality of types of storage media. The storage unit 9 may include a combination of a portable storage medium, such as a memory card, an optical disc, or a magneto-optical disc, and a storage medium reading device. The storage unit 9 may include a storage device used as a temporary storage space such as a random access memory (RAM).

The storage unit 9 stores therein, for example, a transfer control program 9a, address book data 9b, transfer setting data 9c, and call block setting data 9d. The transfer control program 9a provides an incoming call transfer function for controlling transfer of the incoming calls. The address book data 9b includes various types of information on the remote party of a telephone conversation. The transfer setting data 9c includes information on various types of settings relating to the transfer of the incoming calls. The call block setting data 9d contains various kinds of information on call block.

The address book data 9b will be described with reference to FIG. 3. FIG. 3 is a diagram illustrating one of examples of address book data 9b. As illustrated in FIG. 3, the address book data 9b includes such items as a name, a telephone number, a group, an image, and an incoming call setting. The name of a calling party is set for the name item. The telephone number of the calling party is set for the telephone number item. The group to which the calling party belongs is set for the group item. Image data of the calling party is set for the image item. Information on the mode of notification of when an incoming call is received from the corresponding telephone number is set for the incoming call setting item. Examples of the information on the mode of notification include a ring tone, a vibration pattern, a lamp lighting color and pattern, etc.

The address book data 9b illustrated in FIG. 3 includes information corresponding to "Mr. A", "Mr. B", and "Mr. C". In the information on the first line, "Mr. A" is set for the name item, "090-XXXX-XXX1" is set for the telephone number, "Group A" is set for the group item, "yyyyy.pct" is set for the image item, and "ringer A, vibration A, lighting A" are set for the incoming call setting item. In the information on the second line, "Mr. B" is set for the name item, "080-XXXX-XXX2" is set for the telephone number item, "Group B" is set for the group item, and "ringer B, vibration B, lighting B" are set for the incoming call setting item, with no value set for the image item. In the information on the third line, "Mr. C" is set for the name item, "080-XXXX-XXX3" is set for the telephone number item, "zzzzz.pct" is set for the image item, and "ringer C, vibration C, lighting C" are set for the incoming call setting item, with no value set for the group item. In this manner, the address book data 9b links the telephone number with the information on the name, the group, the image, and the incoming call setting.

Registered information is not limited to the example illustrated in FIG. 3. The registered information may include, for example, an e-mail address, a residence address, position information, and other items.

The transfer setting data 9c will be described with reference to FIG. 4. FIG. 4 is a diagram illustrating one of examples of transfer setting data 9c. As illustrated in FIG. 4, the transfer setting data 9c includes such items as call transfer and a destination to which an incoming call is transferred. A value that indicates whether a function to transfer incoming calls is activated or not is set for the call transfer item. An identification number of the transfer destination of the incoming call is set for the destination item. The identification number of the transfer destination of the incoming call is used for specifying the transfer destination to transfer the incoming call.

In the transfer setting data 9c illustrated in FIG. 4, "activated" is set for the call transfer item and "mobile phone 30" is set for the destination item.

The transfer setting data 9c is not limited to the example illustrated in FIG. 4. The transfer setting data 9c may include, for example, a transferring condition, a plurality of transfer destinations, and other items. Examples of the transferring condition include, but are not limited to, such conditions as the incoming call number to be transferred and a period of time during which the transfer is to be performed.

The call block setting data 9d will be described with reference to FIG. 5. FIG. 5 is a diagram illustrating one of examples of call block setting data 9d. As illustrated in FIG. 5, the call block setting data 9d includes such items as specified number block and a telephone number to be rejected. A value that indicates whether the function to reject an incoming call from a specified telephone number is activated or not is set for the specified number block item. The telephone number subjected to the call block is set for the item of telephone number to be rejected.

Figure 9:
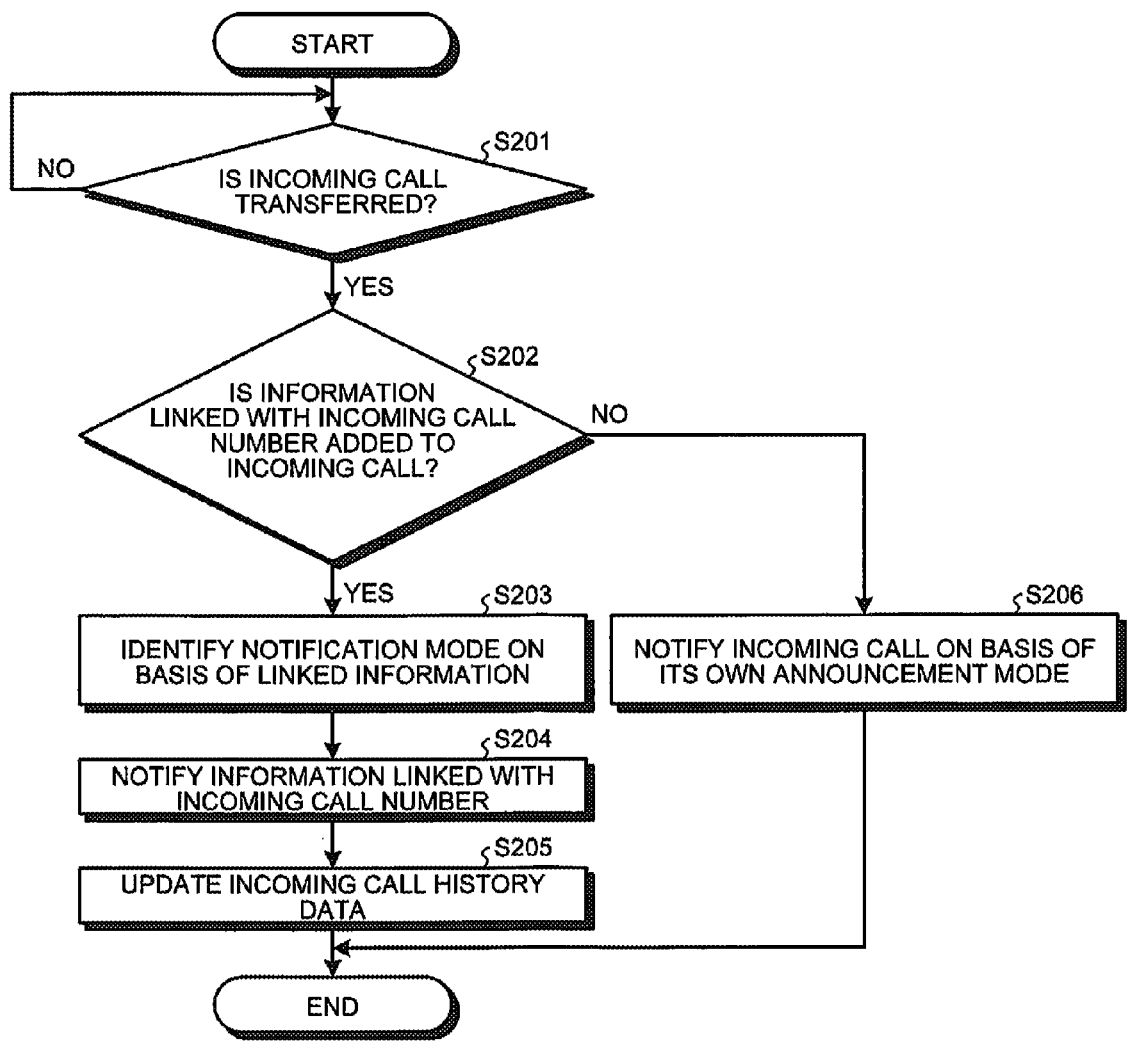
FIG. 9 is a flowchart illustrating one of examples of processing steps for notifying a transferred incoming call.

In the call block setting data 9d illustrated in FIG. 5, "activated" is set for the specified number block item and "090-XXXX-XXXX" is set for the item of telephone number to be rejected. In other words, the call block setting data 9d illustrated in FIG. 9 is set such that any incoming call from the telephone number "090-XXXX-XXXX" is to be rejected. In this manner, the telephone number to be rejected is linked with the information on the specified number block.

The call block setting data 9d is not limited to the example illustrated in FIG. 5. The call block setting data 9d may include a plurality of telephone numbers that are to be rejected. The call block setting data 9d may include such settings as whether to reject an incoming call from an anonymous number, whether to reject an incoming call from a public telephone, whether to reject an incoming call from a telephone number not registered in the address book data 9b, etc.

The items of the address book data 9b, the transfer setting data 9c, and the call block setting data 9d may be distributed or consolidated as appropriate.

The control unit 10 is a processing unit. Examples of the processing unit include, but are not limited to, a central processing unit (CPU), a system-on-a-chip (SoC), a micro control unit (MCU), and a field-programmable gate array (FPGA). The control unit 10 integrally controls operations of the mobile phone 20 to thereby achieve various types of functions.

Specifically, the control unit 10 executes instructions included in the programs stored in the storage unit 9, while referring to data stored in the storage unit 9 as necessary. The control unit 10 controls a functional unit according to the data and the instructions and thereby achieves various types of functions. Examples of the functional unit include, but are not limited to, the display unit 2, the communication units 6a and 6b, the receiver 7, the speaker 11, the vibrating unit 15, and the lamp 16. The control unit 10 may change its control depending on a result of detection made by a detecting unit. Examples of the detecting unit include, but are not limited to, the operating unit 3, the communication units 6a and 6b, and the microphone 8.

The control unit 10 executes the transfer control program 9a to thereby achieve operations of the mobile phone 20 in the transfer control method illustrated in FIG. 1.

The vibrating unit 15 vibrates the mobile phone 20. To vibrate the mobile phone 20, the vibrating unit 15 uses, for example, a piezoelectric element or an eccentric motor. The lamp 16 emits light in set color and pattern. The lamp 16 includes a light source such as a light emitting diode (LED) and is mounted on the mobile phone 20 in such a manner that the light emitted by the light source is visually recognizable from the outside. The display unit 2, the speaker 11, the vibrating unit 15, and the lamp 16 are used for notifying the user of an incoming call, reception of an e-mail, arrival of previously scheduled time, etc.

Figure 6:
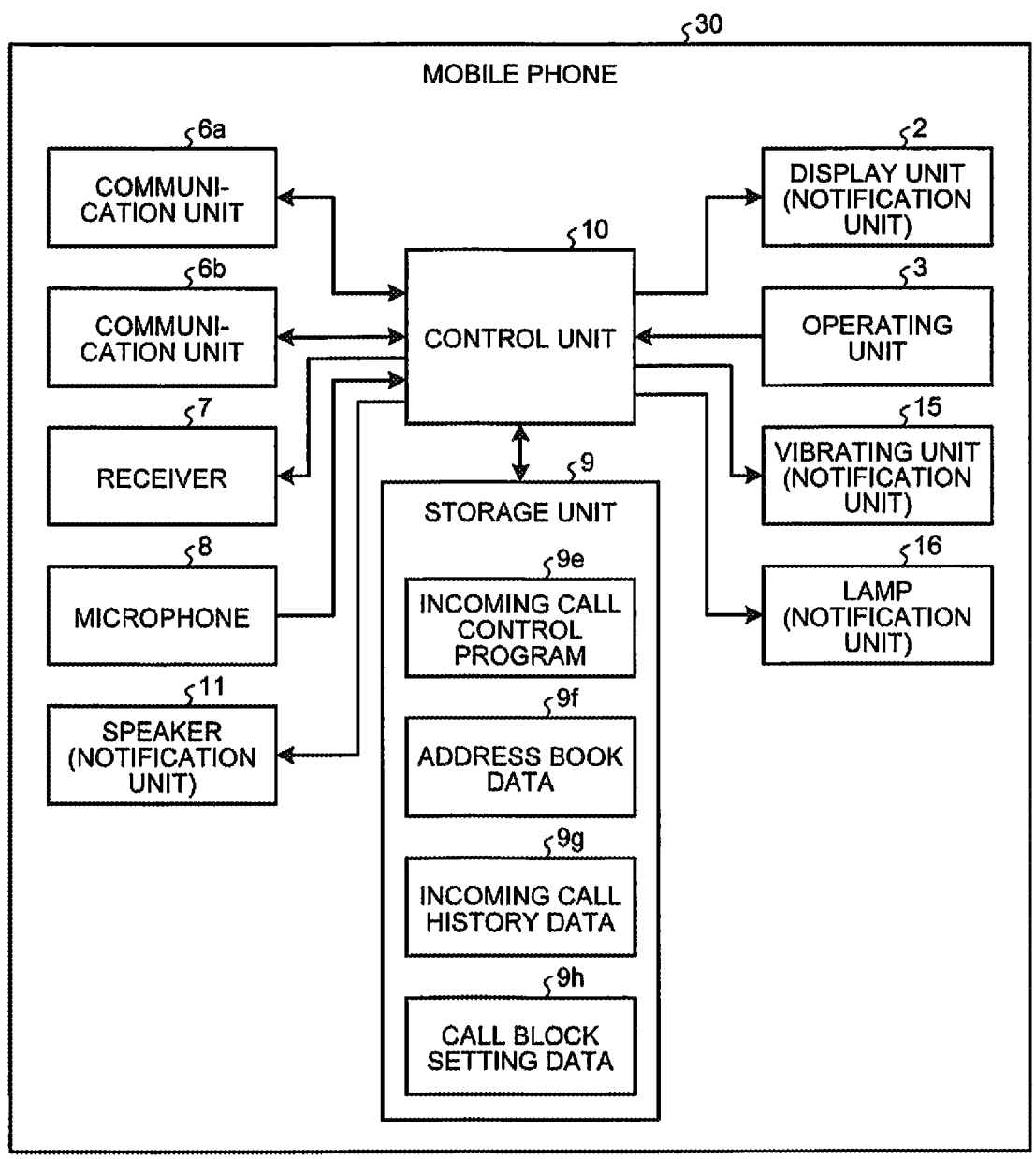
FIG. 6 is a block diagram illustrating a mobile phone to which an incoming call is transferred.

FIG. 6 is a block diagram illustrating the mobile phone 30, that is, the mobile phone to which incoming calls are transferred. As illustrated in FIG. 6, the mobile phone 30 includes a display unit 2, an operating unit 3, communication units 6a and 6b, a receiver 7, a microphone 8, a storage unit 9, a control unit 10, a speaker 11, a vibrating unit 15, and a lamp 16.

The storage unit 9 stores therein, for example, an incoming call control program 9e, address book data 9f, incoming call history data 9g, and call block setting data 9h. The incoming call control program 9e provides an incoming call control function for controlling incoming calls in the mobile phone 30. The address book data 9f includes various types of information on the remote party of a telephone conversation. The incoming call history data 9g includes information on a history of incoming calls. The call block setting data 9h includes various types of information relating to an originating end subjected to the call block. The address book data 9f and the call block setting data 9h have the same configurations as the address book data 9b and the call block setting data 9d of the mobile phone 20.

The incoming call history data 9g will be described with reference to FIG. 7. FIG. 7 is a diagram illustrating one of examples of incoming call history data 9g. As illustrated in FIG. 7, the incoming call history data 9g includes such items as an incoming call number, a date and time, and details. A value that indicates the telephone number of the originating end is set for the incoming call number item. A value that indicates the date and time at which the incoming call is received is set for the date and time item. Information that indicates details of the incoming call is set for the details item. For example, when an incoming call via the public line network 90 is detected at the communication unit 6b, information set for the details item is "incoming call originated by specifying telephone number", for example. Alternatively, when an incoming call is transferred from the mobile phone 20 via the short-range wireless communication by the communication unit 6b, information set for the details item is "transferred incoming call", for example.

The control unit 10 executes the incoming call control program 9e to thereby achieve operations of the mobile phone 30 in the transfer control method illustrated in FIG. 1.

The display unit 2, the speaker 11, the vibrating unit 15, and the lamp 16 function as notification units for notifying the user of an incoming call, reception of an e-mail, arrival of previously scheduled time, etc.

Figure 8:
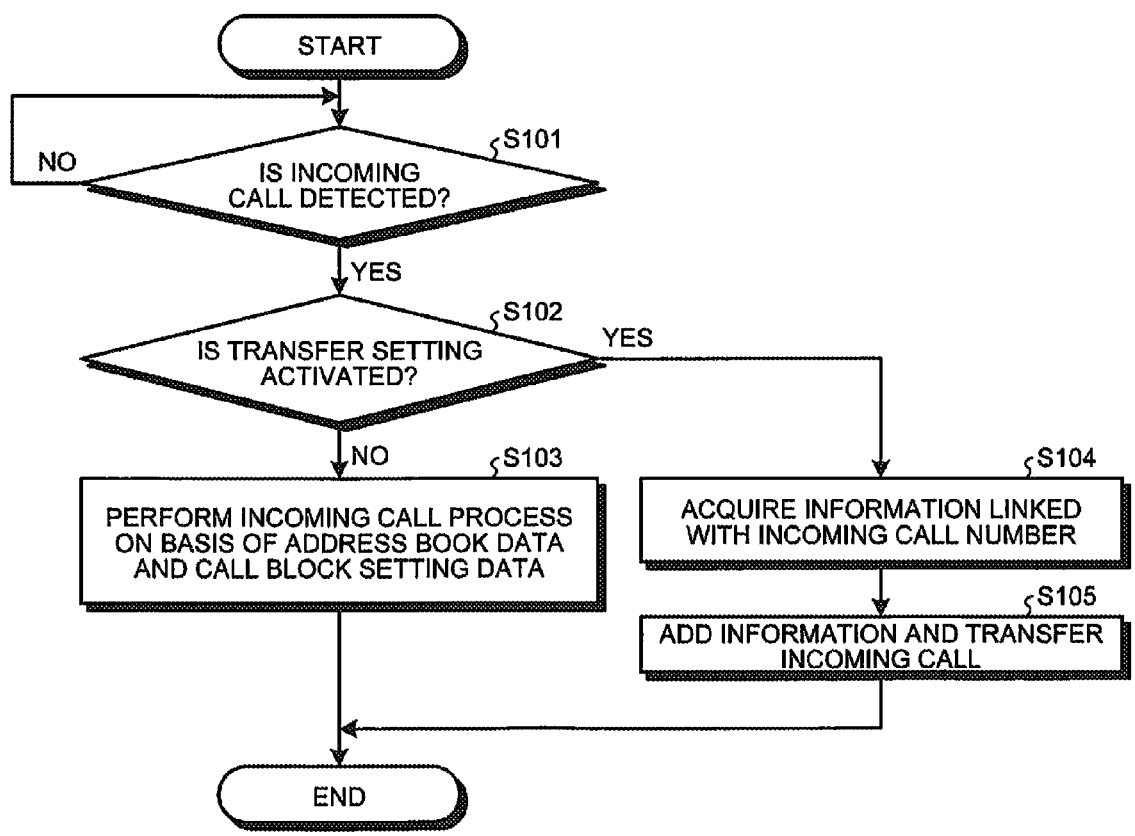
FIG. 8 is a flowchart illustrating one of examples of processing steps for transferring an incoming call.

The following describes, with reference to FIG. 8, processing steps performed by the control unit 10 of the mobile phone 20 on the basis of the transfer control program 9a. FIG. 8 is a flowchart illustrating one of examples of processing steps for transferring an incoming call. The processing steps illustrated in FIG. 8 are repeatedly performed.

As illustrated in FIG. 8, the control unit 10 of the mobile phone 20 determines at Step S101 whether an incoming call is detected. When it is determined that no incoming call is detected (No), the control unit 10 returns to Step S101. When it is determined that an incoming call is detected (Yes), the control unit 10 proceeds to Step S102.

At Step S102, the control unit 10 determines whether a transfer setting is activated. Specifically, when "activated" is set for the call transfer item of the transfer setting data 9c, the control unit 10 determines that the transfer setting is activated. When it is determined that the transfer setting is not activated (No), the control unit 10 proceeds to Step S103. At Step S103, the control unit 10 performs an ordinary incoming call process applicable when the incoming call is received by the mobile phone 20, on the basis of the address book data 9b and the call block setting data 9d.

When it is determined that the transfer setting is activated (Yes), the control unit 10 proceeds to Step S104. At Step S104, the control unit 10 acquires information linked with the incoming call number. Specifically, the control unit 10 searches the address book data 9b in the storage unit 9 for information that includes a telephone number that matches the incoming call number, and acquires corresponding information as the information linked with the incoming call number. When the incoming call is, for example, "090-XXXX-XXX1", the control unit 10 acquires information having "090-XXXX-XXX1" as the telephone number from the address book data 9b.

Furthermore, the control unit 10 searches the call block setting data 9d in the storage unit 9 for a telephone number that matches the incoming call number. When the telephone number is registered as a telephone number subjected to the call block, the control unit 10 acquires the information relating to the call block setting as the information linked with the incoming call number.

Subsequently at Step S105, the control unit 10 transfers, to the transfer destination, the incoming call to which the information linked with the incoming call number is added. The method to be employed for adding the information linked with the incoming call number is not particularly limited. If allowed by the communication scheme to be employed in the transfer, the information linked with the incoming call number may be transmitted as part of control signals. Alternatively, the information linked with the incoming call number may be encoded and modulated through an original method and superimposed on control signals or voice signals for transmission.

The following describes, with reference to FIG. 9, how the control unit 10 of the mobile phone 30 notifies the incoming call transferred thereto. FIG. 9 is a flowchart illustrating one of examples of processing steps for notifying a transferred incoming call. The processing steps illustrated in FIG. 9 are repeatedly performed.

As illustrated in FIG. 9, the control unit 10 of the mobile phone 30 determines at Step S201 whether an incoming call is transferred. When it is determined that no incoming call is transferred (No), the control unit 10 returns to Step S201. When it is determined that an incoming call is transferred (Yes), the control unit 10 proceeds to Step S202.

At Step S202, the control unit 10 determines whether information linked with the incoming call number is added to the incoming call. When it is determined that the information linked with the incoming call number is added to the incoming call (Yes), the control unit 10 identifies, at Step S203, a notification mode for the incoming call on the basis of the information linked with the incoming call number. Specifically, the control unit 10 identifies the notification mode for the incoming call on the basis of the incoming call setting item included in the linked information added to the incoming call. When the linked information includes information of the incoming call setting of "ringer A, vibration A, lighting A", for example, the control unit 10 identifies ringer A, vibration A, and lighting A as the notification mode.

At Step S204, the control unit 10 notifies the information linked with the incoming call. Specifically, the control unit 10, while notifying the incoming call in the notification mode identified at Step S203, displays the information linked with the incoming call number on the display unit 2. When receiving, as the information linked with the incoming call number, information having, for example, "090-XXXX-XXX1" set for the telephone number, "Mr. A" set for the name, "Group A" set for the group, and "yyyyy.pct" set for the image, the control unit 10 displays these pieces of information on the display unit 2. When the notification mode identified at Step S203 is "ringer A, vibration A, lighting A", the control unit 10 causes the speaker 11 to output ringer A, causes the vibrating unit 15 to vibrate in a vibration pattern of vibration A, and causes the lamp 16 to light in a lighting pattern of lighting A.

When the information linked with the incoming call number includes information that indicates that the incoming call number is subjected to the call block, the control unit 10 may perform a notification in a mode to indicate that the incoming call is originated from an incoming call number subjected to the call block, regardless of the information linked with the incoming call number. For example, the control unit 10 may display, on the display unit 2, a message indicating that the incoming call is originated from an incoming call number subjected to the call block and may output a ring tone set exclusively for when the incoming call is from any incoming call number subjected to the call block. When the information linked with the incoming call number includes information indicating that the incoming call number is subjected to the call block, the control unit 10 may disconnect the call without notifying the incoming call.

At Step S205, the control unit 10 updates the incoming call history data 9g. Specifically, the control unit 10 creates incoming call information containing the received telephone number set for the incoming call number item, the date and time at which the incoming call is transferred set for the date and time, and "transferred incoming call" set for the details item. The control unit 10 adds the created incoming call information to the incoming call history data 9g to thereby complete updating the incoming call history data 9g, and then completes the processing steps.

When it is determined at Step S202 that the information linked with the incoming call number is not added to the incoming call (No), the control unit 10 performs a notification on the basis of a notification mode for the mobile phone 30 at S206. Specifically, the control unit 10 causes the speaker 11 to output a ring tone, causes the vibrating unit 15 to vibrate, and causes the lamp 16 to light on the basis of the notification mode for the mobile phone 30, and then terminates the processing steps.

As described above, when the information linked with the incoming call number is added to the incoming call transferred by the mobile phone 20, the mobile phone 30 notifies the incoming call on the basis of the information linked with the incoming call number. This enables the mobile phone 30 to notify the user of the incoming call in a mode corresponding to the incoming call number, even if information on the transferred incoming call is not stored in the mobile phone 30. Thus, the user can easily identify a specific originating party of the transferred incoming call, so that he or she can determine whether to answer the call.

Changes in form and detail may be made in the embodiment disclosed in this application without departing from the spirit and scope of the disclosure. Additionally, the embodiment disclosed in this application and modifications thereof may be combined as appropriate. For example, the above embodiments may be modified as follows.

For example, each of the programs illustrated in FIGS. 2 and 6 may be divided into a plurality of modules or combined with another.

The above embodiments have been described for a case in which the control unit 10 of the mobile phone 20 acquires the information linked with the incoming call number from the address book data 9b and the call block setting data 9d in the storage unit 9. The acquisition of the information is not, however, limited thereto. The control unit 10 may be configured to, for example, acquire the information linked with the incoming call number from another electronic device via the public line network 90.

The above embodiments have been described for a case in which the control unit 10 of the mobile phone 30 transmits, to the transfer destination of the incoming call, the information linked with the incoming call number including, for example, a name, a telephone number, a group, an image, and an incoming call setting. The configuration of the information linked with the incoming call number is not, however, limited thereto. The information linked with the incoming call number only needs to be configured to allow the user at the transfer destination of the incoming call to determine the originating party of the incoming call. For example, the information linked with the incoming call number may include only one piece of information from among, for example, the name, the telephone number, and the image. Alternatively, the information linked with the incoming call number may be set as desired by the user at the transfer destination of the incoming call.

The above embodiments have been described for a case in which the information linked with the incoming call number includes the information that indicates the notification mode for the incoming call at the transfer destination. The configuration of the information linked with the incoming call number is not, however, limited thereto. For example, the information linked with the incoming call number may not include the information on the notification mode.

The above embodiments have been described for a case in which the mobile phone 20 transmits an incoming call to which the information linked with the incoming call number is added, to the mobile phone 30 via the short-range wireless communication. The mobile phone 20 may, however, perform the transmission over a public line network different from the communication unit 6a. For example, the communication standard supported by the communication unit 6b is changed from the short-range wireless communication standard to a cellular phone communication standard. In other words, the combination of the communication standards supported by the communication unit 6a and the communication unit 6b may be, for example, a combination of 2G and 3G, a combination of 3G and 4G, and a combination of 3G and PHS.

The above embodiments have been described for a case in which both the mobile phone 20 and the mobile phone 30 are owned by a single user, but embodiments are not limited thereto. The mobile phone 20 and the mobile phone 30 may be owned by different users. For example, the mobile phone 20 may be owned by a parent, while the mobile phone 30 may be owned by his or her child.

The above embodiments have been described for a case in which the mobile phone 30 does not determine, for any incoming call transferred from the mobile phone 20, whether the incoming call is subjected to the call block, but embodiments are not limited thereto. The mobile phone 30 may determine, when a transferred incoming call is detected, whether the incoming call is subjected to the call block.

For example, assume that the mobile phone 30 at the transfer destination is set to reject an incoming call from the mobile phone 40 and the mobile phone 20 at the transfer destination is set not to reject the incoming call from the mobile phone 40. In this case, the mobile phone 20 transfers the incoming call to which the linked information is added, to the mobile phone 30. The mobile phone 30 does not notify the incoming call because the incoming call number of the transferred incoming call is subjected to the call block.

The above embodiments have been described for a case in which the mobile phone 20 and the mobile phone 30 each have an incoming call restriction function for specified number block. The incoming call restriction function may be executed, however, on the basis of such call block items as anonymous number blocking, public telephone blocking, and not-registered number blocking.

The above embodiments have been described for a case in which the mobile phone 20 transfers an incoming call to the mobile phone 30 and transmits the information linked with the incoming call number to the mobile phone 30, but embodiments are not limited thereto. Alternatively, for example, the mobile phone 30 may have a function of transferring incoming calls to the mobile phone 20. In this case, the mobile phone 20 may be configured to notify the incoming call transferred from the mobile phone 30 on the basis of the telephone number and the information linked with the telephone number received from the mobile phone 30.

The above embodiments have been described for a case in which the mobile phone 20 determines whether to reject incoming calls, but embodiments are not limited thereto. For example, when an electronic device on the public line network 90 determines the call block for the mobile phone 20, the electronic device on the public line network 90 may inform a device paired with the mobile phone 20 of an incoming call. For example, the telephone number or the e-mail address or the like of the mobile phone 30 paired with the mobile phone 20 is registered in the electronic device on the public line network 90. The electronic device on the public line network 90 does not inform the mobile phone 20 of an incoming call when the detected incoming call is originated from a telephone number for which the mobile phone 20 sets call blocking. Thus, no incoming call from the originating end for which the call block is set is recorded in the incoming call history of the mobile phone 20. The electronic device on the public line network 90 then adds, to the incoming call, information relating to incoming call restriction and call block set by the mobile phone 20 as linked information and notifies the mobile phone 30 paired with the mobile phone 20 of this incoming call. In this case, the mobile phone 30 notifies the user of the incoming call notified from the electronic device on the public line network 90.

Although the art of appended claims has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

The invention claimed is:

1. An electronic device, comprising:
a first communication unit configured to perform communication using a first communication scheme;
a second communication unit configured to perform communication using a second communication scheme; and
a control unit configured to,
when the first communication unit detects an incoming call,
add information linked with an incoming call number of the incoming call to the incoming call; and
transfer the incoming call with the added information from the second communication unit to another electronic device.

2. The electronic device according to claim 1, further comprising:
a storage unit configured to store therein the information linked with the incoming call number,
wherein the control unit is configured to acquire the information linked with the incoming call number from the storage unit.

3. The electronic device according to claim 1, wherein the control unit is configured to acquire information relating to a notification mode for the incoming call as the information linked with the incoming call number.

4. The electronic device according to claim 1, wherein, when the incoming call is originated from a telephone number set to be subjected to call block,
the control unit is configured to acquire information relating to the call block as the information linked with the incoming call number.

5. The electronic device according to claim 1, wherein the second communication scheme is a short-range wireless communication scheme.

6. An electronic device, comprising:
a first communication unit configured to perform communication using a first communication scheme;
a second communication unit configured to perform communication using a second communication scheme; and
a control unit configured to,
when (i) the second communication unit detects an incoming call transferred by another electronic device, and (ii) information linked with an incoming call number of the incoming call is determined to have been added to the incoming call by said another electronic device which transfers the incoming call to the second communication unit,
process the incoming call according to the information.

7. The electronic device according to claim 6, further comprising:
a notification unit,
wherein
the information linked with the incoming call number includes information relating to a notification mode of the incoming call, and
the control unit is configured to cause the notification unit to perform a notification in the notification mode according to the information.

8. A transfer control method performed by an electronic device including a first communication unit configured to perform communication using a first communication scheme and a second communication unit configured to perform communication using a second communication scheme, the transfer control method comprising:
detecting an incoming call by the first communication unit; and
when the first communication unit detects the incoming call,
adding information linked with an incoming call number of the incoming call to the incoming call; and then
transferring the incoming call with the added information from the second communication unit to another electronic device.

9. The electronic device according to claim 1, wherein the incoming call number of the incoming call is a predetermined incoming call number.

10. The electronic device according to claim 1, wherein
when the first communication unit detects the incoming call, the control unit is configured to transfer the incoming call to the another electronic device during a predetermined time period.

11. The transfer control method according to claim 8, wherein
the incoming call number of the incoming call is a predetermined incoming call number.

12. The transfer control method according to claim 8, wherein
when the first communication unit detects the incoming call, the incoming call is transferred to the another electronic device during a predetermined time period.

\* \* \* \* \*